Sept. 8, 1925.
H. FORD
VEHICLE CONSTRUCTION
Filed June 15, 1922
1,552,689
2 Sheets-Sheet 1
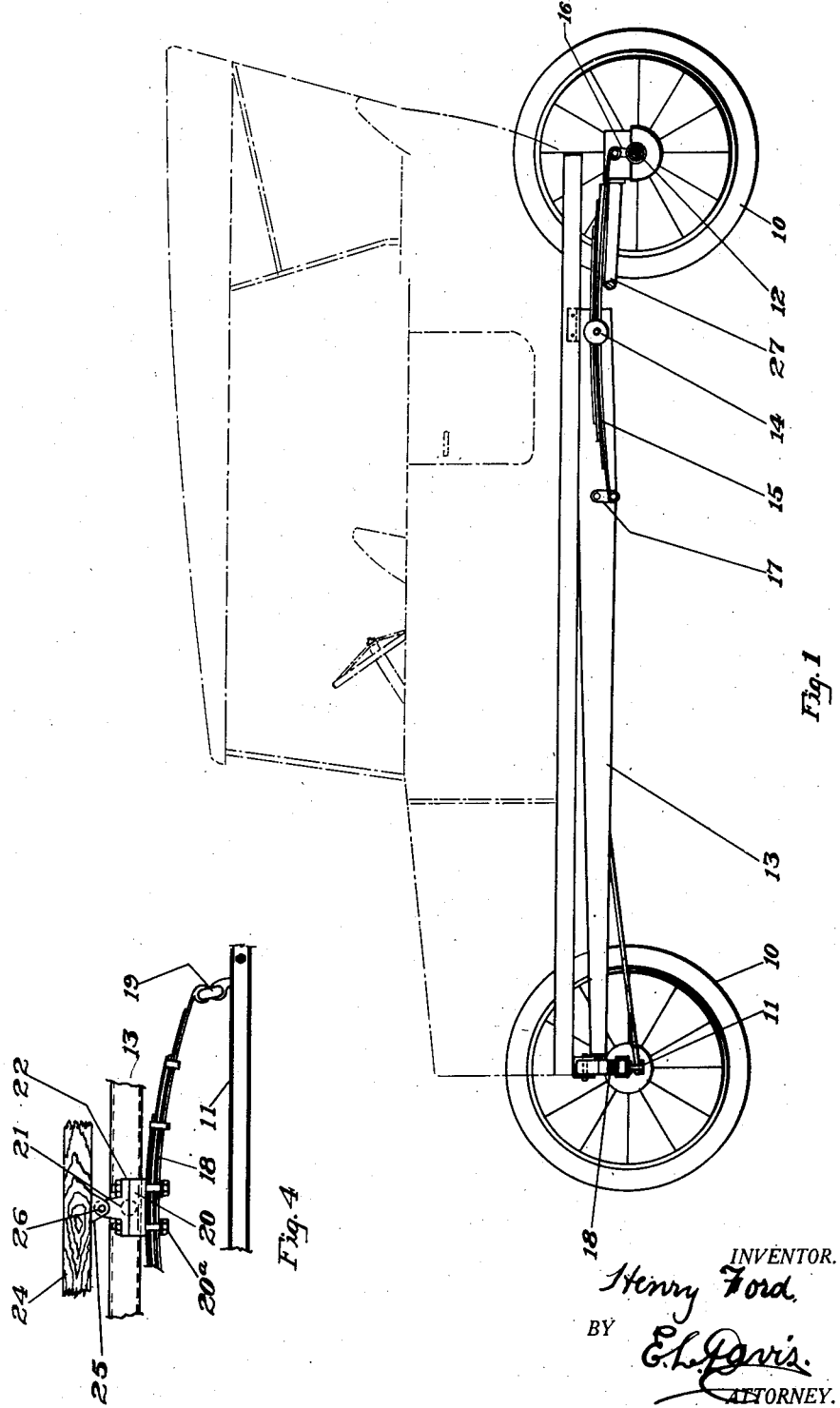

Sept. 8, 1925.
H. FORD
VEHICLE CONSTRUCTION
Filed June 15, 1922
1,552,689
2 Sheets-Sheet 2
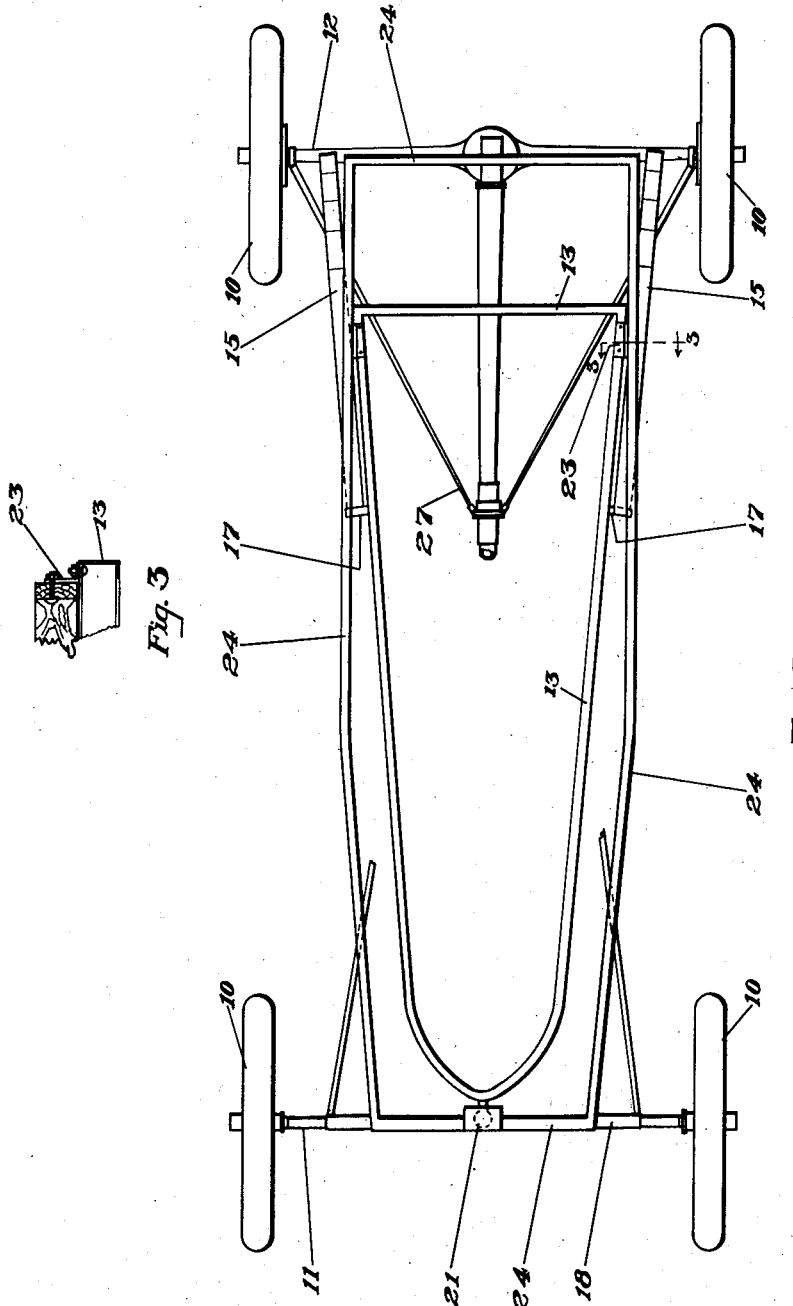
WITNESS:
INVENTOR.
Henry Ford,
BY
ATTORNEY.

Patented Sept. 8, 1925.

1,552,689

UNITED STATES PATENT OFFICE.

HENRY FORD, OF DEARBORN, MICHIGAN.

VEHICLE CONSTRUCTION.

Application filed June 15, 1922. Serial No. 568,372.

*To all whom it may concern:*

Be it known that I, HENRY FORD, a citizen of the United States, and residing in the village of Dearborn, in the county of Wayne and State of Michigan, have invented new and useful Improvements in Vehicle Construction, of which the following is a specification.

The object of my invention is to provide improvements in vehicle construction, of simple, durable, and inexpensive construction.

A further object of my invention is to provide a spring suspension and a body mounting and chassis mounting for a vehicle designed to allow the springs, chassis frame, and body to each perform its functions freely and, so far as possible, without interference from the other elements of the vehicle.

A further object of my invention is to provide a novel type of three-point support for a chassis frame relative to the running gear of the chassis and to provide, in combination with this structure, a three-point support for the body which may be said to be supported on the running gear independently of the chassis frame, and which also has a three-point support.

A further object of my invention is to provide a type of spring suspension for a vehicle wherein the vibration of the engine or rotating parts will not be transmitted to any degree to the body parts and wherein the springs may function only as springs and not have the additional undesirable thrust thereon which occurs in connection with the spring mounting with which I am familiar.

With these and other objects in view, my invention consists in the arrangement, combination and construction of the various parts of my improved device, as described in the specification, claimed in my claim, and shown in the accompanying drawings, in which:

Figure 1 illustrates a side elevation of a vehicle embodying one form of my invention, the near wheels being removed to better illustrate the invention, and the body being shown in broken lines in order to make the construction of the remaining parts clear.

Figure 2 shows a top or plan view of the vehicle disclosed in Figure 1.

Figure 3 shows an enlarged detail sectional view taken on the line 3—3 of Figure 2, and Figure 4 shows an enlarged elevation of the portion of the front of the vehicle disclosed.

Referring to the accompanying drawings I have used the reference numeral 10 to indicate, generally, the wheels of a vehicle having the front axle 11 and rear axle 12. Mounted above the axles 11 and 12 is a substantially triangular engine supporting frame 13, or chassis frame, formed of channel steel from which the chassis frames of motor vehicles in use are generally formed. It will be noted, however, that this frame is of somewhat less length than the distance between the axles 11 and 12. At either side of this frame and adjacent to the rear end thereof a spring clip 14 is disposed and forms the connection between the frame 13 and a semi-elliptical leaf spring 15. This spring 15 has one end provided with the usual shackle attachment 16 which is connected to the rear axle 12. The forward end of the spring 15 is provided with a hanger shackle attachment 17 which connects with the frame 13 forwardly of the spring support 14.

From the construction of the parts just described it will be seen that the frame 13 is supported at its rear end at the center of the elliptical springs 15 and in such a way that the weight of the frame 13 and the weight thereon will be applied substantially directly at the center of the spring 15 with little or no additional or accidental stresses or thrusts.

The front axle 11 is provided with a transverse semi-elliptical leaf spring 18 which is shackled or otherwise secured to the axle 11 at 19. At the center of this semi-elliptical spring 18 is a saddle 20 having attaching bolts 20ª designed to encircle and clamp the center of the leaves of the spring 18.

The chassis frame 13, as has been heretofore mentioned, is of what may be termed "triangular shape" and the forward end thereof is provided with a ball indicated by the dotted lines 21 which extends into a ball socket in the saddle 20. This saddle is provided with a removable upper portion 22 designed to permit the placement and removal of the ball 21 into the saddle. This upper portion 22 of the saddle 20 is also provided with an upwardly extending longitudinally perforated ear for a purpose which will hereinafter be described.

From the construction of the parts just described, it will be seen that the weight disposed on the chassis frame 13 which will be transmitted to its forward support will be concentrated in the ball 21 which in turn is mounted for universal movement in the saddle 20. This saddle 20 clamps to the center of the front spring 18 whereby the weight from the forward end of the chassis frame is transmitted directly to the center of the spring 18 which in turn may transmit it to the axle 11. By this universal connection between the frame and the saddle it will be seen that movement of the frame in any direction will not stress the spring in such a way as to give the effect of putting greater weight on one side of the spring than on the other. In this conection it may be explained that in the vehicles with which I am familiar the chassis frame is clamped rigidly to the saddle 20 so that twisting of the chassis frame 13 on its horizontal longitudinal axis results in placing a greater weight pressure on one side of the spring than on the other side, whereby the spring is unnaturally strained and the full benefit of said spring is not obtained. It may also be noted in this connection that radius rods of ordinary type are extended between the axle 11 and the chassis frame 13 so that movement of the chassis frame 13 relative to the axle 11 will be limited substantially to a swinging on a horizontal center thru the chassis frame 13.

A pair of clamps or brackets 23 are secured to the chassis frame 13 directly over the spring support 14 altho, of course, these brackets 23 may if desired, form part of the spring support 14. Each of these brackets is connected to one side of the body frame 24 of the vehicle. The forward end of the body frame 24 is pivoted to the saddle 20 to permit limited movement on the horizontal longitudinal axis of the body frame. This pivoting may be accomplished by extending a pair of ears 25 downwardly from the forward central portion of the body frame 24 which will receive the ear on the upper portion of the saddle 20 so that a pin 26 may be passed thru these ears to form a horizontal pivot.

From the construction just described, it will be seen that the body frame and chassis frame are each supported by what is termed a "three-point support" and that the points of support for both of these frames are directly over the center or the proper point of application for weight of the springs 15 and 18. Moreover, it will be seen that the type of connection between the chassis and body frames, and the springs, is such that unnatural stresses or forces will not be applied to the springs due to the type of mounting employed so that the spring may be free to exert their full elasticity for carrying the load applied to them.

In this connection it may be mentioned that radius rods 27 are provided for aligning the rear axle 12 relative to the chassis frame 13, these radius rods being of any desired or convenient construction, and that similar radius rods should be provided in connection with the front axle 11.

Among the many advantages arising from the use of my improved vehicle it should be specifically pointed out that the engine vibration is transmitted to the chassis frame which in turn is substantially independent of the body frame so that the engine vibration transmitted to the body will be largely eliminated by the use of my improved vehicle. Moreover, stresses on the spring caused by the buckling and bending of the chassis or body frames which ordinarily occur with the vehicles with which I am familiar, are eliminated to a large extent by my improved construction. Furthermore, it will be noted that the parts are simple, and readily attachable relative to each other and are of such construction that they may be readily interchangeable for replacement or repair.

Some changes may be made in the arrangement and in construction of the various parts of my improved device without departing from the spirit of the invention therein, and it is my intention to cover by my claim such changes as may be reasonably included within the scope thereof.

I claim as my invention:

In a vehicle, front and rear axles, a chassis frame, a body frame, springs extended between the rear ends of said frames and the rear axle, a spring associated with the front axle, a saddle secured to said spring having a pair of sockets therein, and means for pivoting each of said frames in said saddle to permit independent rotation thereof on their longitudinal axes.

June 1st, 1922.

HENRY FORD.